United States Patent [19]

Graf

[11] 3,955,130

[45] May 4, 1976

[54] MOTOR CONTROL CIRCUIT INCLUDING MOTOR CURRENT LIMITING MEANS

[75] Inventor: Carlton E. Graf, Erie, Pa.

[73] Assignee: General Electric Company, Erie, Pa.

[22] Filed: Dec. 20, 1974

[21] Appl. No.: 534,671

[52] U.S. Cl. .............................. 318/332; 318/341; 318/434
[51] Int. Cl.² ......................................... H02P 7/06
[58] Field of Search ............ 318/332, 341, 434, 345

[56] References Cited
UNITED STATES PATENTS

| | | | |
|---|---|---|---|
| 3,470,437 | 9/1969 | Douglass | 318/332 |
| 3,500,161 | 3/1970 | Domann et al. | 318/332 X |
| 3,526,819 | 9/1970 | Graf | 318/332 X |
| 3,586,949 | 6/1971 | Spear et al. | 318/332 X |
| 3,809,984 | 5/1974 | Hoge | 318/332 X |
| 3,855,511 | 12/1974 | Smith | 318/332 X |

*Primary Examiner*—Gene Z. Rubinson
*Attorney, Agent, or Firm*—Arnold E. Renner; Philip L. Schlamp

[57] ABSTRACT

A motor control circuit of the type in which the effective power supplied to the motor is controlled to govern motor operation includes a fast acting current limit circuit responsive to the motor current and operative to limit the power supplied to the motor to thus prevent excessive motor current. The current limit circuit compares a signal indicative of the motor current with a reference signal having a value which varies with respect to time and which is reset in response to prescribed control circuit conditions.

15 Claims, 7 Drawing Figures

MOTOR CONTROL CIRCUIT INCLUDING MOTOR CURRENT LIMITING MEANS

BACKGROUND OF THE INVENTION

The present invention relates generally to a motor control circuit and more particularly to a motor control circuit employing improved means to limit motor current.

Many motor control circuits, well known in the art, act to govern motor operation and include means to limit the motor current. It is also known that certain motors, particularly d.c. motors, can be controlled by varying the effective applied power. Perhaps the most common method today of varying effective power supplied to a motor, at least with respect to larger motors, employs what is known as phase control of a controlled rectifier bridge (commonly silicon controlled rectifiers) which is disposed between an alternating current source and motor. In a phase controlled bridge, the power is varied by controlling the point in time relative to the a.c. voltage at which each rectifier of the bridge is rendered conductive. When the control system further includes current limiting means, it is known that one way of achieving the limiting function is by using the current limiting means to control, during those periods when the motor current is at its limit, the point in time at which each controlled rectifier is rendered conductive.

One such system as has been outlined above is described in U.S. Pat. No. 3,526,819, "Current Limit For Motor Control Systems" by Carlton E. Graf, issued Sept. 1, 1970 and assigned to the assignee of the present invention. In this patent a signal proportional to the motor current is compared to a fixed value or reference such that when the motor current exceeds that value the firing of the next rectifier in the bridge is delayed until such time as the motor current falls below the value. This system provides a very fast response current limit which is quite satisfactory in most instances. When the motor is running at its current limit, the firing of the controlled rectifier bridge is solely under the control of the current limit circuit. However, in certain instances, particularly when there is a sudden loading of the motor at high regenerative voltages, instability can occur resulting in a motor current which varies rather severely and which tends to render motor operation somewhat erratic.

SUMMARY OF THE INVENTION

It is, therefore, an object of the present invention to provide a motor control system employing an improved motor current limiting circuit.

It is a further object to provide an improved motor control circuit of the type in which controlled rectifiers are used to control the effective power supplied to a motor which circuit further employs an improved circuit for limiting motor current.

It is still another object to provide an improved motor current limiting circuit for a motor control system which limit circuit employs a reference signal of varying value for comparison with a motor current feedback signal.

Another object is to provide an improved motor current limit circuit which employs a varying reference signal for a comparison with a signal indicative of motor current to provide a more stable control of motor operation in a control system employing phase controlled rectifiers for varying the effective power supplied to the motor.

The foregoing and other objects are achieved by providing a motor control system employing at least one feedback loop which loop serves to limit the amount of current permitted to exist in a motor. This current limiting is achieved by first providing a signal which is proportional to the motor current and comparing that signal with a varying reference signal such that when the two signals enjoy a prescribed relationship further application of the power is inhibited. The varying reference signal is preferably varied rectilinearly and recurs in response to a prescribed condition of the total system. In the preferred embodiment the varying reference signal is of generally saw-toothed configuration and is reset with each firing of a controlled rectifier within the power bridge.

DESCRIPTION OF THE DRAWINGS

While this specification terminates with claims specifically defining and setting forth what is considered to be the present invention, a clearer understanding thereof may be had from the following description taken in conjunction with the accompanying drawings in which:

DETAILED DESCRIPTION

Figure 1:
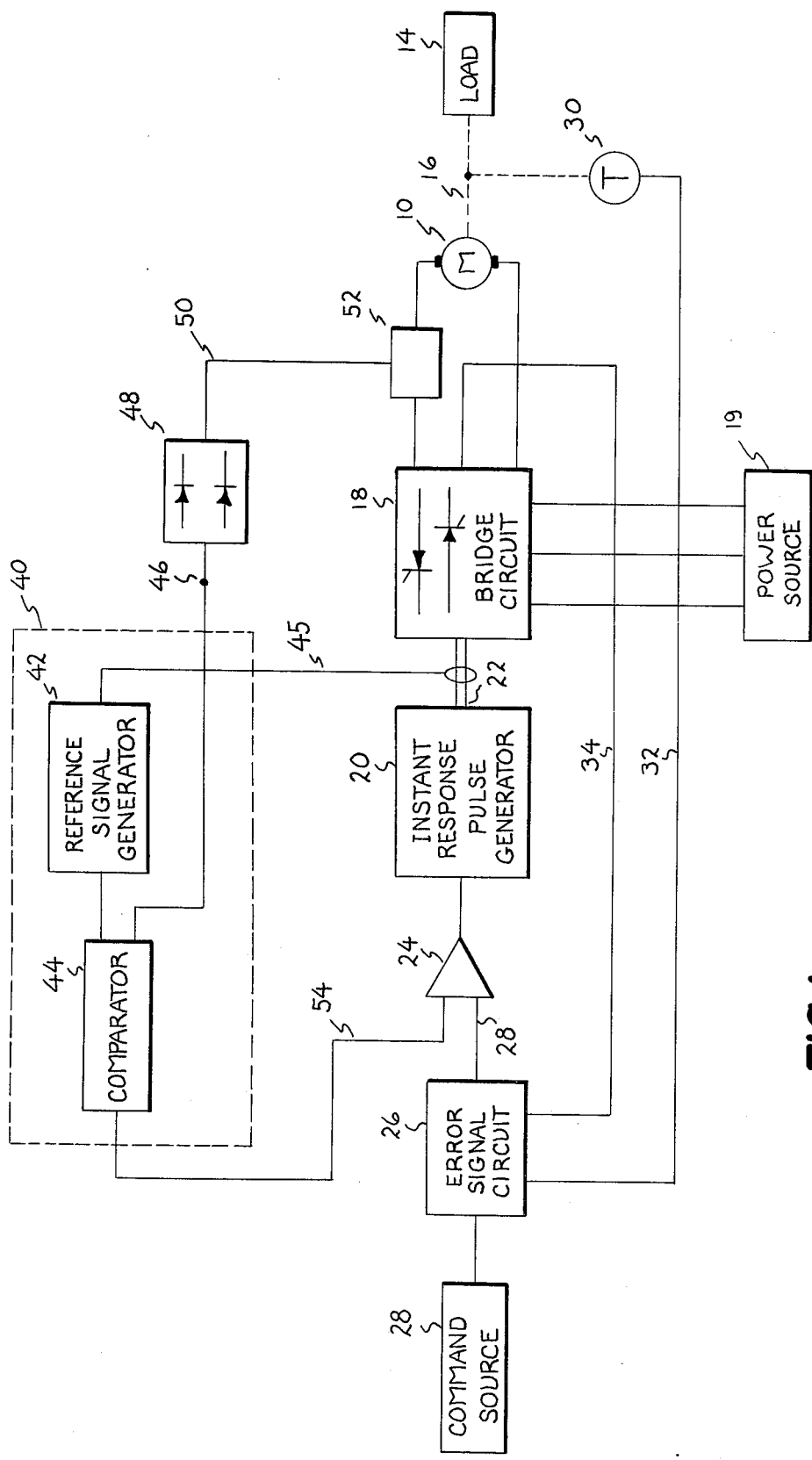
FIG. 1 is a block diagram of a motor control system in accordance with the present invention.

Referring now to FIG. 1, showing the motor control system of the present invention in major block form, it is seen that there is included a motor 10 for driving a suitable load indicated generally at 14 as indicated by the dotted line 16. Power is supplied to the motor 10, which for purposes of illustration may be a d.c. motor, by way of a full-wave or half-wave rectification bridge 18 which receives power from a source indicated at 19. The exact power source 19 is not material to the present invention but may be, for example, a three-phase 60 Hz source. In this case, bridge circuit 18 could be comprised of the well-known bridge configuration comprising two bridges of six thyristors each to thus supply full-wave rectified power to the motor 10 in either of two directions to permit bidirectional operation of the motor. In this type of bridge there is included a pair of controlled rectifiers for each phase such that by proportioning the point in time during which an individual rectifier is conductive during its respective 180° period of the source voltage, the amount of power may be controlled to the motor. Bridge 18 is under the control of an instantaneous response pulse generator 20 which supplies pulses via a bus 22 to the rectifiers of the bridge. The time at which the generator 20 provides pulses to the bridge 18 is a function of a signal derived from an amplifier 24 which in turn receives an error signal from an error signal circuit 26 by way of a connection 28.

The exact nature of the error signal circuit 26 is not material to the present invention and may take any of several known forms illustrated generally through three inputs provided to the circuit 26 to provide for the basic motor control. These inputs include a first from a command source 28 which may be, for example, a manually adjustable potentiometer which serves to establish the basic desired operating parameter of the motor, for example, speed. Other inputs to the error signal circuit 26 are shown to be the output of a tachometer 30 which provides a signal via line 32 to the error signal circuit 26 which is proportional to the speed of the motor. The third input to the circuit 26 is shown via line 34 and may be a voltage feedback signal which is taken from the output of bridge 18 to provide a signal to the circuit 26 proportional to the motor voltage. That described and illustrated thus far is a standard motor control circuit having a speed feedback loop as illustrated by the tachometer 30 and a voltage limit circuit as shown via line 34 and a more complete description of such a system may be found in the aforementioned U.S. Pat. No. 3,526,819 which patent is specifically incorporated hereinto by reference.

In accordance with the present invention there is provided a third feedback loop which is one which limits the motor current. This current limiting circuit is shown in this block form within dotted line box 40. The current limiting circuit of the present invention includes a reference signal generator 42, the output of which forms one input of a two input comparator 44. As will be more fully understood as this description proceeds, the reference signal generator 42 provides at its output a reference signal having a value which varies with respect to time and which is reset in accordance with the occurrence of an operating condition within the system. Preferably, and in accordance with the preferred embodiment of the present invention, the generator 42 produces a reference signal which varies rectilinearly in a saw-tooth fashion and is reset each time that one of the rectifiers of the bridge 18 is rendered conductive or fired. This resetting is accomplished by a signal supplied to the generator 42 via a lead 45 which is connected to the leads 22 connecting the generator 20 and the bridge 18. Thus, a reset signal appears on line 45 each time a pulse is supplied from the generator 20 to fire one of the rectifiers of the bridge 18.

The second input to the comparator 44 is from a terminal 46 the signal at which is derived from a full-wave rectification bridge 48. Bridge 48 is connected by a suitable conductor 50 to a means for developing a signal which is proportional to the value of the current to the motor 10. In the illustrated embodiment this means is shown as a current transducer 52 connected to one of the motor power leads. Thus, the signal appearing on line 50 will have a value which is proportional to the motor current. The use of the full-wave bridge 48 insures that the input to comparator 44 will be one which is unidirectional regardless of the direction of current in the motor 10.

Comparator 44 compares the signals from the generator 42 and at terminal 46 and provides an output on its output line 54 whenever the value of the signal at terminal 46 exceeds the output of the reference signal generator 42; that is, whenever the value representing the motor current exceeds that of the reference signal generator. The signal on line 54 serves as a second input to the amplifier 24 and serves to inhibit the operation of that amplifier. As such, the presence of a signal on line 54 inhibits amplifier 24 which will in turn inhibit the instant response pulse generator 20 from operating and providing pulses to actuate the next rectifier in the bridge. Thus, it is seen that whenever the motor current exceeds the prescribed desired level, a signal will appear on line 54 which will prevent the firing of the next rectifier in the bridge and hence limit the application of power to the motor. However, when the motor current falls to a sufficiently low value such that its feedback signal at terminal 46 is equal to the value of the reference signal generator output, the signal on line 54 will be removed and amplifier 24 will be allowed to pass the error signal from the circuit 26 in the known fashion to permit the next firing of a rectifier in the bridge. As has been previously indicated, an output from the generator 20 to enable a rectifier of the bridge 18 will provide a signal via line 45 which will effect a resetting of the reference signal generator 42.

Figure 4:
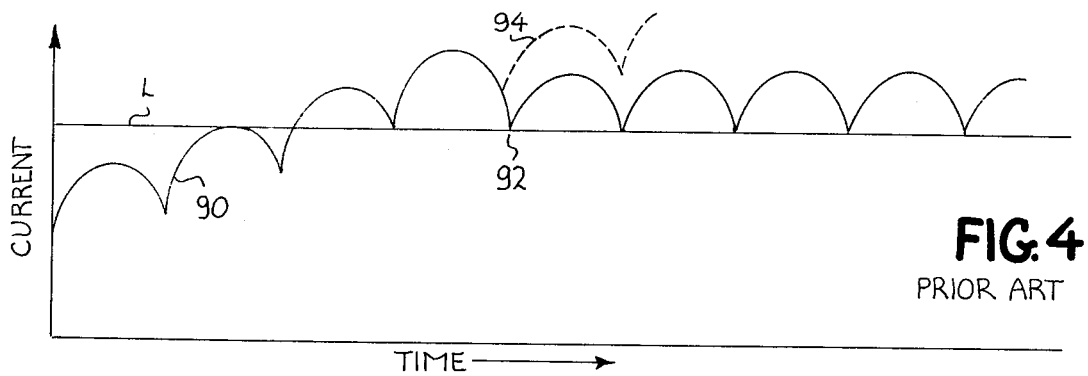

Before continuing with a more detailed description of the means by which the current limiting function is achieved in accordance with the present invention, it is believed well to first review the problem prevalent in the prior art. This problem may best be understood by referring to FIGS. 4 and 5. In FIG. 4 there is shown a graph of instantaneous motor current (ordinate) with respect to time (abscissa). A horizontal line L represents a fixed level current limit in a system which prevents or inhibits firing of the rectifiers on the bridge so long as the instantaneous motor current represented by line 90 exceeds the value of L. As shown in FIG. 4, the current will build up in a pulsed manner until such time as it exceeds the current limit level L at which time firing of the next rectifier in the bridge is inhibited until the current reduces to the limit level as is indicated, for example, at point 92. Line 94, the dotted line, illustrates what might happen to the instantaneous motor current if no limiting circuitry were present. In this instance, the motor current would continue to build up until such time as protective devices came into play or the motor were damaged by overcurrent.

Figure 5:
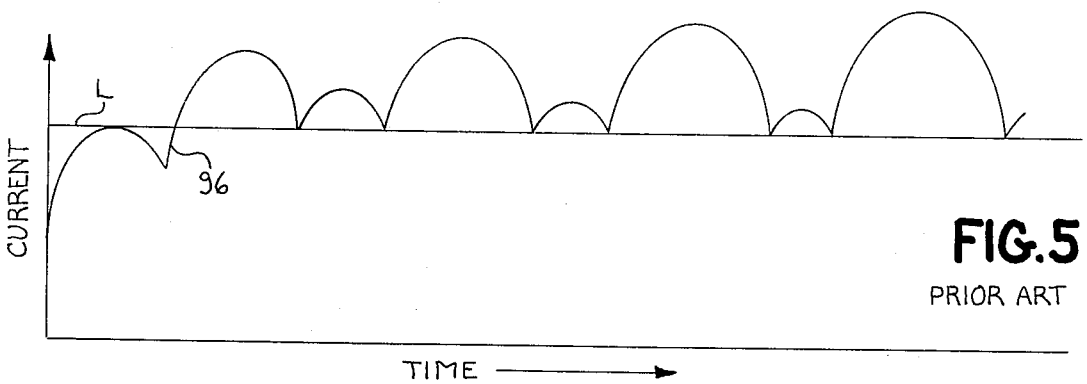

FIG. 5 illustrates what can happen in a control system of the fixed level type such as is described in the aforementioned U.S. Pat. No. 3,526,819 when the control is of a switching action rather than continuously regulating action and when conditions of sudden loading at high regenerative voltages exist. As shown in FIG. 5 the result of sudden excessive motor loading is a rapidly rising current waveshape which can substantially exceed the current limit level in one conduction interval. The current limit control inhibits firing of the next rectifier in the bridge until a significant time later in the a.c. cycle than firing would have occurred. This amount of rectifier firing phase-back results in less power being delivered to the motor in the next rectifier conduction interval and a lower magnitude current pulse. This lower current pulse intersects the current limit level relatively earlier in the conduction interval such that the next firing of the controlled rectifier bridge produces a higher magnitude current pulse. Normally this magnitude difference between adjacent current pulses decreases rapidly with time and the current waveshape becomes symmetrical similar to that shown in FIG. 4. However, under some operating conditions the magnitude difference between adjacent current pulses will increase with time as shown in FIG. 5 and a repetitive high pulse-low pulse form of current instability will result. The operating conditions which lead to this instability are a combination of current overshoot at high regenerative voltages, particularly with motors having relatively large motor inductances.

At high regenerative voltages and/or with high inductive motors, the slope of di/dt of the descending portion of each current pulse is substantially less than at other operating conditions. As the angle of intersection between the descending portion of the current pulse and the current limit level L decreases, the ratio of the change in rectifier phase-back time to the change in current pulse magnitude increases. It is believed that when this intersection angle becomes less than 45°, the form of current instability shown in FIG. 5 results. This instability can become quite bad resulting in undesirable motor torque pulsations and possible commutation failure in the controlled rectifier bridge.

Figure 2:
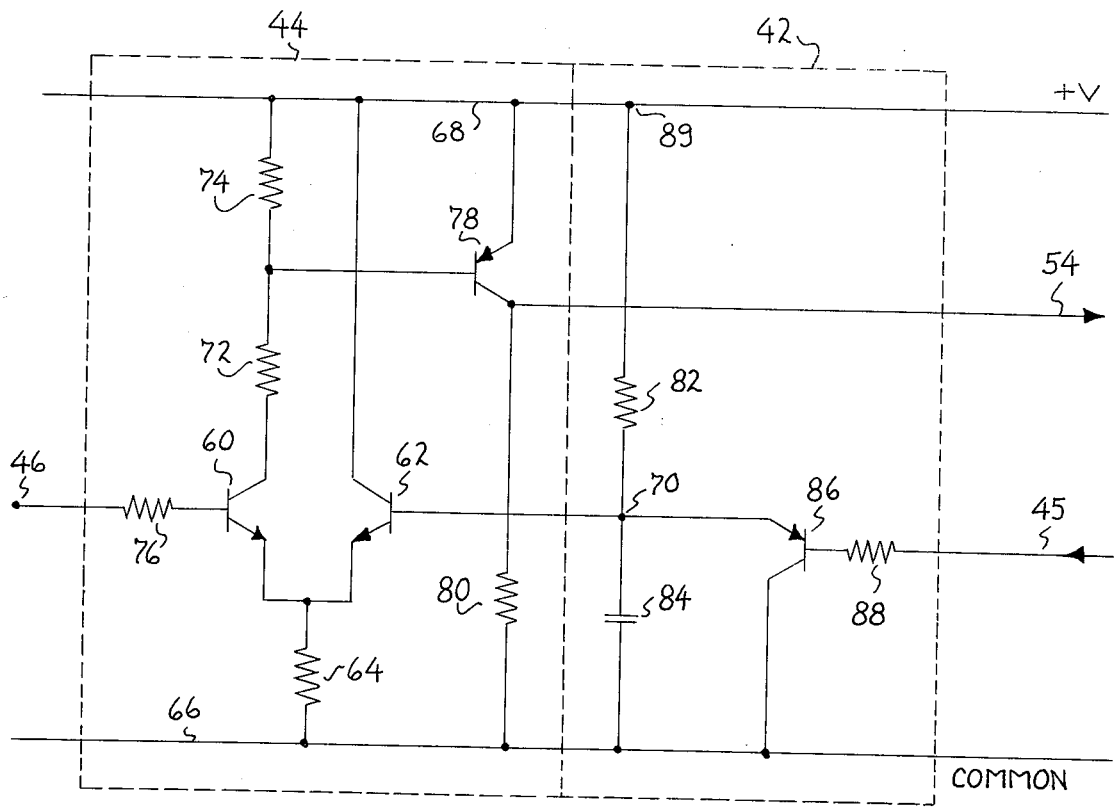
FIG. 2 is a schematic diagram of a first embodiment of the current limit circuit of the present invention.

The present invention overcomes these problems of the prior art and one possible implementation of the circuitry of block 40 of FIG. 1 is shown in FIG. 2. As shown in FIG. 2, comparator 44 includes a common emitter transistor pair 60 and 62 each of which has its emitter connected by way of a resistor 64 to a common bus 66. Transistor 62 has its collector connected to a source of positive potential (+V) on bus 68. The base of transistor 62 has applied thereto a voltage from a junction 70 within the reference signal generator 42 as will be more fully explained hereinafter. The collector of transistor 60 is connected by way of two resistors 72 and 74 to the positive potential bus 68 and its base may be connected by way of a suitable scaling resistor 76 to terminal 46 which, as will be remembered from FIG. 1, presents a signal the value of which is proportional or indicative of the instantaneous motor current. The juncture of resistors 72 and 74 and hence the voltage at this junction is connected to the base of a third transistor 78 which has its emitter connected to the positive bus 68 and its collector connected through a resistor 80 to the common bus 66. The signal which appears at the collector of the transistor 78 serves as the signal on line 54 which in the presently being described embodiment is a control or inhibit signal applied to the amplifier 24 of FIG. 1 and which, when a positive value, serves to inhibit the operation of that amplifier.

The reference signal generator 42 may be comprised of a simple integrating circuit including a resistor 82 and a capacitor 84 connected in series between the positive bus 68 (junction 89) and the common bus 66. The junction point 70 between the resistor 82 and the capacitor 84 is connected, as previously indicated, to the base of transistor 62 and is further connected to the emitter of an additional transistor 86 the collector of which is connected to the common bus 66. The reset signal via line 45 (see FIG. 1) is applied to the base of transistor 86 by way of a suitable scaling resistor 88 such that the appearance of the proper signal on the line 45 will render the transistor 86 conductive.

The operation of the circuit of FIG. 2 is as follows. In the absence of the signal on line 45, transistor 86 will be nonconductive and the capacitor 84 will begin to charge toward the value of voltage +V at a rate dependent upon the RC time constant of the series combination of the resistor 82 and 84. This voltage is applied to the base of transistor 62 rendering that transistor conductive. When the base voltage of transistor 60, a function of the instantaneous motor current, exceeds the voltage to the base of transistor 62, transistor 60 will be rendered conductive and transistor 62 will be rendered nonconductive. Prior to the rendering of transistor 60 conductive, transistor 78 was held in a nonconductive state by virtue of the positive voltage supplied to the base thereof. When, however, transistor 60 conducts, the voltage at the base of transistor 78 will drop and that transistor will begin to conduct such that there will appear at the collector thereof, and on line 54, a signal which magnitude a magnitiude approximately equal or only slightly less than the voltage of the common bus 68. As seen in FIG. 1, the signal on line 54 is applied to the amplifier 24 to inhibit firing of the next rectifier in the bridge. As the a.c. voltage in the conducting phase falls below the motor counter emf voltage, the motor current will begin to decrease such that the signal appearing at terminal 46 will diminish. When the value of the voltage at the base of transistor 62, the varying reference voltage, exceeds that at the base of transistor 60, transistor 62 will be rendered conductive, transistor 60 nonconductive, and transistor 78 will cease to conduct removing the inhibiting signal on line 54. Generator 20 (FIG. 1) is now free to provide a pulse to the next rectifier in the bridge circuit resulting in a reset signal being applied via line 45 to the base of transistor 86 rendering that transistor conductive and discharging capacitor 84. Because of the low impedance of the capacitor discharge path, this action is substantially instantaneous and the cycle just described will repeat.

Figure 6:
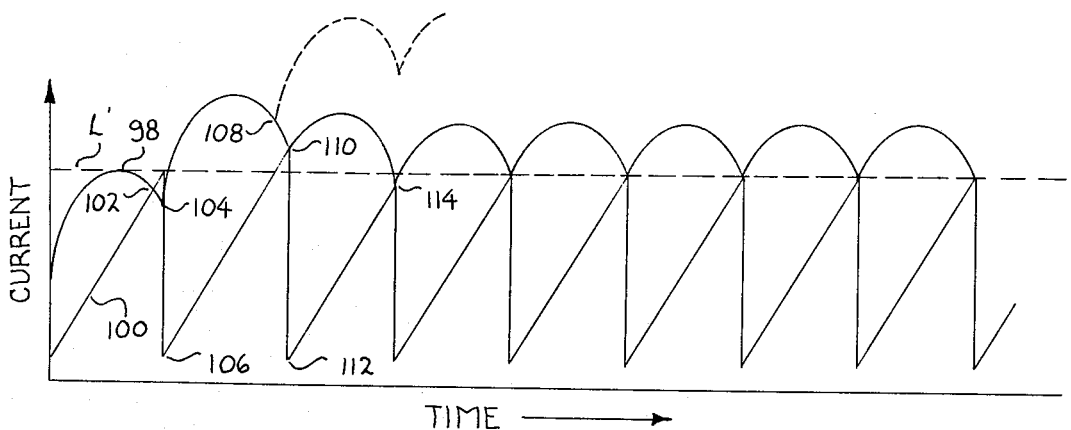

A more thorough understanding of the operation of the FIG. 2 circuit and the manner in which the present invention solves the problems of the prior art may be had by reference to FIG. 6. In FIG. 6, motor current is once again plotted on ordinate with time being shown on the abscissa. The horizontal dotted line L' indicates the motor current value to which limit is desired while the instantaneous motor current is illustrated by the line 98 and the reference voltage to which the motor current is compared is represented by the rectilinear curve 100 which in FIG. 6 is basically of a saw-tooth configuration. As shown in FIG. 6, the motor current will build up toward the prescribed current limit represented by the line L' and the first crossover of the motor current signal and the reference signal occurs at point 102. The reference signal will not be reset at point 102 for the reason that this is not the proper time for the firing of the next rectifier of the bridge 18 as determined by the normal control 26.

It will be immediately recognized that throughout much of the operation of the present invention, the normal control path is inhibited at amplifier 24 of FIG. 1 because the motor current value is above that of the saw-tooth reference signal, even though the average current level is below the desired current limit level. It should be remembered, however, that a three-phase full wave phase controlled rectifier is fired six times each cycle, and that in the 60 degree intervals between rectifier firings, no control is possible. Therefore, whether amplifier 24 is inhibited or not is only pertinent at the instant in time when the firing of the next rectifier is called for by the control. In FIG. 6 at point 104, the next rectifier firing occurs as scheduled since the inhibiting signal was removed at point 102 when the motor current signal dropped below the reference signal. This firing signal also resets the reference signal via line 45 of FIG. 1 which results in the reapplication of the control inhibit signal since the reference signal at point 106 is now below the motor current signal. However, at the next scheduled firing of a controlled rectifier at point 108 the motor current signal is still above the reference signal, because of the increase in motor loading, and this firing is inhibited at amplifier 24. Therefore, point 108 where inhibiting of a scheduled rectifier firing first occurs, is the time at which the current limit actually can be said to have become operative.

The manner in which the present invention solves the problem of the prior art will now be explained. Since point 108 in FIG. 6 occurs a scheduled 60 degrees later than the previous firing at point 104, the saw-tooth reference signal 100 will have reached the desired current limit level L'. However, since the next rectifier firing has been inhibited because the motor current signal is above this level, the reference signal is not reset but continues to increase at the slope set by resistor 82 and capacitor 84 of FIG. 2. The intersection of the motor current and reference signals at point 110 of FIG. 6 releases the inhibit signal, allows the next rectifier to fire and resets the reference signal to the same level at point 112 as it was reset to at point 106. This intersection at point 110 occurs somewhat earlier in time than an intersection of the motor current signal and the constant level L' would have occurred. Therefore, this firing of the next rectifier is not phased back quite as much as it would be with a constant level reference, resulting in a higher current pulse than was obtained in FIG. 5. Since this current pulse is still of lower magnitude than a normal pulse, it would intersect the constant reference level L' in less than 60 electrical degrees. However, the saw-tooth reference signal has not reached the L' level in this less than 60° interval such that the intersection of the current signal and the saw-tooth reference at point 114 will occur somewhat later than the intersection with level L'. As such, the firing of the next rectifier is not phased forward quite as much as it would have been with a constant level reference, resulting in a lower current pulse than in FIG. 5. Thus it can be seen that the saw-tooth reference acts to equalize the firing times and current pulse widths, which equalizes the current pulse magnitudes. From a stability viewpoint, the ascending slope of the saw-tooth reference signal causes the intersection between it and the current signal to always occur at a large angle which is a requirement for stable operation for this type of switching control.

While, of course, the particular component values used in any system will depend upon the selected limits and the total system, the table below is one example of suitable component values.

| ITEM | VALUE or TYPE |
| --- | --- |
| Transistors 60 & 62 | 2N4424 |
| Transistors 78 & 86 | 2N5366 |
| +V | 20 volts |
| Resistor 64 | 1.5K ohms |
| Resistor 72 | 100K ohms |
| Resistor 74 | 10K ohms |
| Resistor 76 | 22K ohms |
| Resistor 80 | 22K ohms |
| Resistor 82 | 121K ohms |
| Resistor 88 | 2.2K ohms |
| Capacitor 84 | 0.1 mf |

Figure 3:
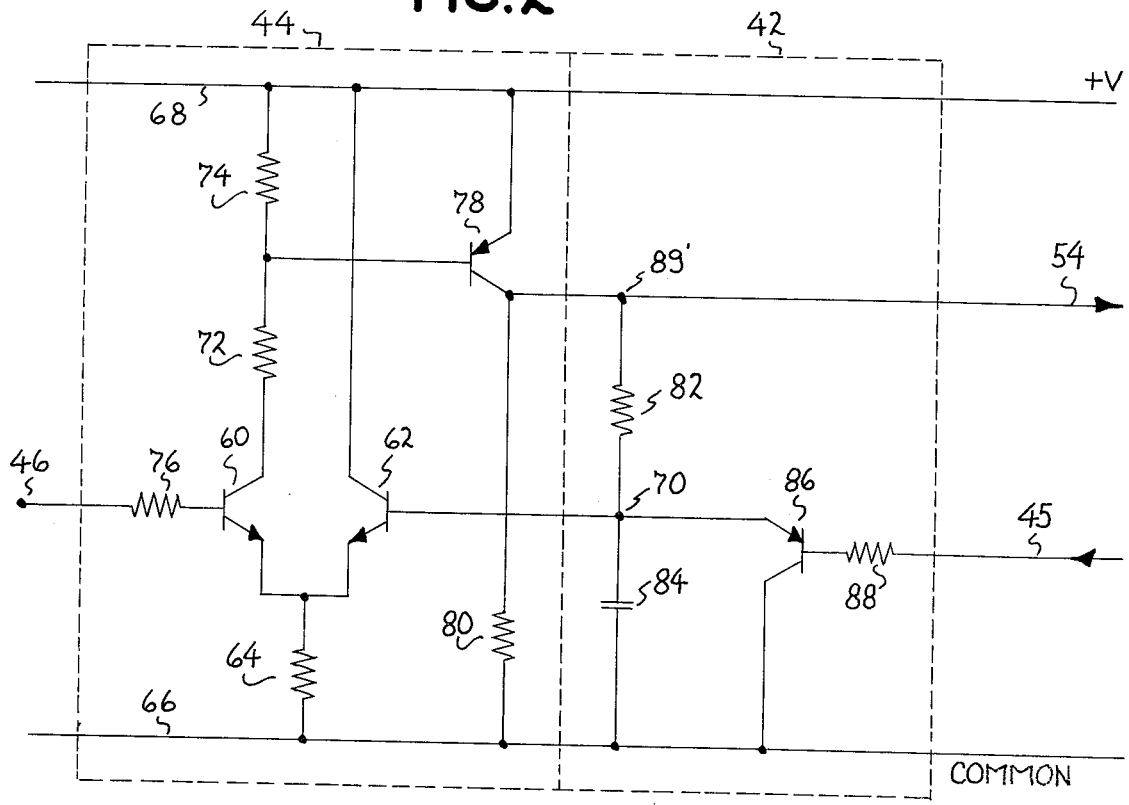
FIG. 3 is a schematic diagram of a second embodiment of the current limit circuit of the present invention; and, FIGS. 4–7 are waveshapes useful in understanding the present invention.
Figure 7:
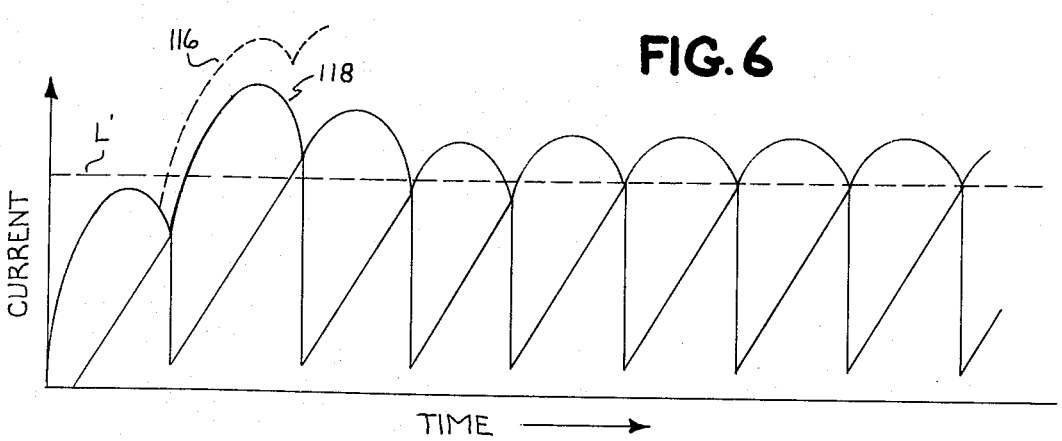

FIG. 3 illustrates a second embodiment of the present invention. This embodiment is identical to that shown in FIG. 2 with the exception that the ramp function generator or integrator comprising the resistor 82 and the capacitor 84 is connected to the collector of the transistor 78, as indicated by junction 89', as opposed to being connected to the positive bus at junction 89 as is shown in FIG. 2. Thus, in this case the capacitor will charge only when the circuit is in current limit, that is, when the control or inhibit signal appears on line 54. This provides a lead characteristic to the current limit operation for use in situations where there exists a very rapidly rising motor current. FIG. 7, which also plots motor current against time illustrates the operation of this embodiment of the invention. FIG. 7 shows that in this embodiment the ramp function reference signal begins to develop at a point in time later than that of the previous example because of the transistor voltage threshold, and by this tends to limit the current overshoot by delaying slightly the permissive firing of the bridge rectifiers as the motor current develops. This is illustrated by comparing the dotted line 116 which would indicate the time of permissive firing in the case of FIG. 2 embodiment with the solid line 118 which is the actual motor current representation in the present embodiment. This later permission of firing during motor current build-up tends to reduce the motor current overshoot and thus present a more precise control. Subsequent operations of the FIG. 3 embodiment as illustrated in FIG. 7 are substantially identical to that shown with respect to FIGS. 2 and 6 and subsequent motor operation is not affected.

Thus, it is seen that there has been provided a motor control system employing a current limit which effectively sets a stable current limit under adverse conditions. While the invention has been explained and described with the aid of the particular embodiment hereof it will be understood that the invention is not to be limited thereby and that many modifications retaining and utilizing the spirit thereof without departing essentially therefrom will occur to those skilled in the art. For example, the illustrated embodiments are for a fixed current limit value. Either of these circuits could be made variable simply by making the resistor of the reference signal generator (i.e., resistor 82) variable. It is, therefore, contemplated by the appended claims to cover all such modifications as fall within the spirit and scope of the invention.

What is claimed is:

1. In an electric motor control system of the type including controllable means for varying the effective power supplied to the motor for varying the operation thereof, means for limiting motor current by limiting the effective power delivered to the motor comprising:
    a. means to sense the value of the motor current and to produce a feedback signal proportional thereto;
    b. means to generate a reference signal having a value which varies with respect to time;
    c. means to initiate a new generation of said reference signal with each occurrence of a prescribed condition within said system;
    d. comparator means to compare said feedback signal and said reference signal and to produce a control signal in response to a prescribed relationship therebetween; and,
    e. means responsive to said control signal to govern the operation of the controllable means to thereby vary the effective power supplied to the motor.

2. The invention in accordance with claim 1 wherein said reference signal varies rectilinearly.

3. The invention in accordance with claim 1 wherein said reference signal has a generally saw-tooth configuration.

4. The invention in accordance with claim 1 wherein said comparator means includes a pair of common emitter transistors, one of which when rendered conductive serves to initiate the production of said control signal.

5. The invention in accordance with claim 1 wherein the means to generate the reference signal comprises a series circuit including a resistor and a capacitor connected between a source of voltage.

6. The invention in accordance with claim 1 wherein the means to generate the reference signal comprises a series circuit including a resistor and a capacitor which is connected between a voltage source only upon occurrence of said control signal.

7. In an electric motor control system of the type employing at least one controlled rectifier for varying the amount of power delivered from a source to the motor, means for limiting the motor current by determining the point in time when the controlled rectifier is rendered conductive comprising:
 a. means to sense the value of the motor current and to produce a feedback signal proportional thereto;
 b. means to generate a reference signal having a value which varies with respect to time;
 c. means to initiate a new generation of said reference signals with each rendering of the controlled rectifier conductive;
 d. comparator means to compare said feedback signal and said reference signal and to produce an inhibit signal in response to a prescribed relationship therebetween; and,
 e. means responsive to said inhibit signal to prohibit the rendering of said controlled rectifier conductive.

8. The invention in accordance with claim 7 wherein said reference signal varies rectilinearly.

9. The invention in accordance with claim 7 wherein said reference signal has a generally saw-tooth configuration.

10. The invention in accordance with claim 7 wherein said comparator means includes a pair of common emitter transistors, one of which when rendered conductive serves to initiate the production of said inhibit signal.

11. The invention in accordance with claim 7 wherein the means to generate the reference signal comprises a series circuit including a resistor and a capacitor connected between a source of voltage.

12. The invention in accordance with claim 7 wherein the means to generate the reference signal comprises a series circuit including a resistor and a capacitor which circuit is connected to a source of voltage only upon occurrence of said inhibit signal.

13. The invention in accordance with claim 7 wherein a plurality of controlled rectifiers are employed and in which:
 a. the means to initiate the new generation of said reference signal is responsive to the rendering of any of the rectifiers conductive; and,
 b. the means responsive to the inhibit signal serves to prohibit the rendering of any of said rectifiers conductive.

14. A system for controlling an electric motor comprising:
 a. means including a controlled rectifier for controlling the amount of power supplied to the motor from a source by varying the point in time when the rectifier is rendered conductive; and,
 b. means for controlling the point in time said controlled rectifier is rendered conductive including a motor current limiting feedback loop comprising,
  1. means to sense the value of the motor current and to produce a feedback signal proportional thereto;
  2. means to generate a reference signal having a value which varies with respect to time;
  3. means to initiate a new generation of said reference signals with each rendering of the controlled rectifier conductive;
  4. comparator means to compare said feedback signal and said reference signal and to produce an inhibit signal in response to a prescribed relationship therebetween; and,
  5. means responsive to said inhibit signal to prohibit the rendering of said controlled rectifier conductive.

15. The invention in accordance with claim 14 wherein a plurality of controlled rectifiers are employed and in which:
 a. the means to initiate the new generation of said reference signal is responsive to the rendering of any of the rectifiers conductive; and,
 b. the means responsive to the inhibit signal serves to prohibit the rendering of any of said rectifiers conductive.

* * * * *